US006993987B2

(12) United States Patent
Komura (10) Patent No.: US 6,993,987 B2
(45) Date of Patent: Feb. 7, 2006

(54) METER UNIT HAVING INDICATION PART AND CONTROL PART

(75) Inventor: Takashi Komura, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/760,485

(22) Filed: Jan. 21, 2004

(65) Prior Publication Data
US 2004/0211352 A1 Oct. 28, 2004

(30) Foreign Application Priority Data
Jan. 21, 2003 (JP) ............................. 2003-012084

(51) Int. Cl.
*G01D 7/02* (2006.01)
(52) U.S. Cl. .................................... 73/866.1
(58) Field of Classification Search ................ 73/866.1
See application file for complete search history.

(56) References Cited

U.S. PATENT DOCUMENTS

| | | | | |
|---|---|---|---|---|
| 3,720,106 A | * | 3/1973 | Varga | 73/273 |
| 4,296,411 A | * | 10/1981 | Romanelli et al. | 340/870.02 |
| 4,607,527 A | * | 8/1986 | Sears | 73/866.1 |
| 5,220,963 A | * | 6/1993 | Patton | 175/24 |
| 5,341,886 A | * | 8/1994 | Patton | 175/24 |
| 5,419,405 A | * | 5/1995 | Patton | 175/27 |
| 5,439,064 A | * | 8/1995 | Patton | 175/24 |
| 5,994,893 A | * | 11/1999 | Maruyama et al. | 324/144 |
| 6,124,806 A | * | 9/2000 | Cunningham et al. | 340/870.02 |
| 6,496,786 B1 | * | 12/2002 | Dieterle et al. | 702/145 |
| 6,519,999 B2 | * | 2/2003 | Komura et al. | 73/1.88 |
| 6,624,608 B2 | * | 9/2003 | Komura | 318/696 |
| 6,633,811 B1 | * | 10/2003 | Aumayer | 701/207 |
| 6,741,058 B2 | * | 5/2004 | Yamada et al. | 318/685 |
| 2002/0081976 A1 | * | 6/2002 | Fujisawa et al. | 455/66 |
| 2004/0211352 A1 | * | 10/2004 | Komura | 116/47 |

FOREIGN PATENT DOCUMENTS

JP U-H03-4218 1/1991

OTHER PUBLICATIONS

First office action (copy and translation) in the corresponding Chinese application. Chinese Patent Application No. 200410002951.9.

* cited by examiner

Primary Examiner—Hezron Williams
Assistant Examiner—Rodney Frank
(74) Attorney, Agent, or Firm—Posz Law Group, PLC (57) ABSTRACT

A meter unit for indicating a physical quantity includes an indication part and a control part. The indication part memorizes a first indication deviation data, which provides a deviation between a detected value detected by a physical quantity sensor and a raw value indicated by the indication part without compensating the deviation. The control part memorizes a second indication deviation data, compensates the detected value on the basis of the second indication deviation data, and controls the indication part on the basis of the compensated detected value. The second indication deviation data is rewritable so that the second indication deviation data coincides with the first indication deviation data.

7 Claims, 9 Drawing Sheets

METER UNIT HAVING INDICATION PART AND CONTROL PART

CROSS REFERENCE TO RELATED APPLICATION

This application is based on Japanese Patent Application No. 2003-12084 filed on Jan. 21, 2003, the disclosure of which is incorporated herein by reference.

FIELD OF THE INVENTION

The present invention relates to a meter unit having an indication part and a control part. The meter unit is suitably used for a vehicle.

BACKGROUND OF THE INVENTION

A meter unit includes a scale plate, a pointer, a stepping motor unit and a central processing unit (i.e., CPU). The CPU controls the stepping motor unit, so that the stepping motor unit rotationally drives the pointer on the scale plate. The meter unit according to a prior art has a problem that the pointer indicates (i.e., points to) an incorrect value, which deviates from a correct value. Here, the correct value is a detected value of a physical quantity detected by an outside physical quantity sensor. Specifically, the pointer indicates a misdirected position, which deviates from a correct position. The correct position is a target position, which shows the correct value.

This indication deviation arises from several positioning deviations and the like. For example, when the pointer is mounted on the stepping motor unit, the positioning between the pointer and the stepping motor unit has a certain deviation, which causes the indication deviation. Further, when the scale plate is mounted on the stepping motor unit, the positioning between the scale plate and the stepping motor unit has another certain deviation, which also causes the indication deviation. Therefore, the meter unit has a proper indication deviation.

In view of the above problem, a meter unit having a memory for storing (i.e., memorizing) an indication deviation data of the meter unit is disclosed in Japanese Unexamined Utility Model Application Publication No. H03-4218. A CPU of the meter unit controls a stepping motor unit in consideration of the stored deviation data in such a manner that a detected value detected by a sensor is compensated with the stored deviation data. Thus, a pointer indicates a correct value, which is the detected value.

However, if a part of the meter unit such as the stepping motor unit, the CPU, and the memory fails after the meter unit is delivered to a market place, the whole meter unit is necessitated to exchange for repairing the meter unit. That is because it is difficult to exchange only a failed part of the meter unit. Specifically, only the failed part of the unit cannot be detached from the meter unit so as to repair the failed part. Thus, the whole meter unit is required to detach and exchange. Therefore, a maintenance cost of the meter unit becomes higher.

SUMMARY OF THE INVENTION

In view of the above problem, it is an object of the present invention to provide a meter unit having low maintenance cost.

A meter unit indicates a physical quantity, which is detected by an outside physical quantity sensor. The unit includes an indication part for indicating the physical quantity and a control part. The indication part memorizes a first indication deviation data, which provides a deviation between a detected value detected by the sensor and a raw value indicated by the indication part without compensating the deviation. The control part memorizes a second indication deviation data of the indication part, compensates the detected value on the basis of the second indication deviation data, and controls the indication part on the basis of the compensated detected value. The second indication deviation data is rewritable so that the second indication deviation data coincides with the first indication deviation data.

In the above unit, the meter unit can be repaired with exchanging only the damaged part, when one part of the indication part and the control part is damaged and fails. Thus, the meter unit is repaired without exchanging the whole meter unit, so that the maintenance cost of the meter unit becomes small.

Further, the indication part and the control part are independent each other so as to be exchangeable, and are electrically connected together. Therefore, even if the design of the indication part is changed in accordance with a type of vehicle or a grade of vehicle, the control part can be a common part. Thus, the manufacturing cost of the meter unit is reduced.

Preferably, the indication part includes a scale plate having a scale for showing the physical quantity; a pointer for indicating the compensated detected value of the physical quantity; a stepping motor unit for rotating the pointer; and a first memory for memorizing the first indication deviation data of the indication part. The control part includes a second memory for memorizing the second indication deviation data; and a controller for compensating the detected value on the basis of the second indication deviation data, and for controlling the stepping motor unit on the basis of the compensated detected value. The second memory is capable of rewriting the second indication deviation data to the first indication deviation data.

More preferably, the indication part further includes a plurality of pairs of the pointer and the stepping motor unit, each pair of which indicates a physical quantity, respectively. The second memory memorizes the second indication deviation data corresponding to a plurality of pairs of the pointer and the stepping motor unit. The controller compensates each detected value detected by each outside physical quantity sensor on the basis of the second indication deviation data, and controls each stepping motor unit on the basis of the compensated detected value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

The inventor primarily attempted to provide a meter unit having an indication part and a control part. If one of two parts fails, the failed one part can be exchangeable. Here, the indication part includes a scale plate, a pointer, and a stepping motor unit. The control part includes a memory for memorizing an indication deviation data of the meter unit and a CPU. The failed one part includes a failed part such as the scale plate, the pointer, the stepping motor unit, the memory and the CPU.

However, if one of two parts fails, the whole failed one part is necessitated to exchange. Therefore, a maintenance cost of the unit is comparatively high, although the maintenance cost of the unit is lower than that of a meter unit according to a prior art.

Further, after the failed one part is repaired or exchanged, the indication deviation data memorized in the memory may be different from an actual indication deviation data of the indication part only if the failed one part is simply exchanged. That is because the indication part has a proper indication deviation data, so that the memorized indication deviation data is different from the actual indication deviation data after the failed one part is exchanged.

In consideration of the above attempt, a meter unit according to a first embodiment of the present invention has a following construction. FIGS. 1 to 4 show the meter unit 1 according to the first embodiment having an indication part 10 and a control part 20. The indication part 10 and the control part 20 are independent each other so as to be exchangeable, and are electrically connected together.

The meter unit 1 is suitably used for a vehicle, and is disposed on an instrument panel (not shown) of the vehicle. The instrument panel is mounted in a passenger compartment of the vehicle. The meter unit includes a plurality of physical quantity meters such as a vehicle speed meter, an engine tachometer, a coolant temperature meter for indicating a temperature of engine coolant, and a fuel meter for indicating a fuel level in a fuel tank. Each physical quantity meter is connected to a physical quantity sensor (not shown). When the sensor detects a physical quantity, the sensor outputs the detected value of the physical quantity to the physical quantity meter. Then, the meter indicates the detected value of the physical quantity.

Figure 1:
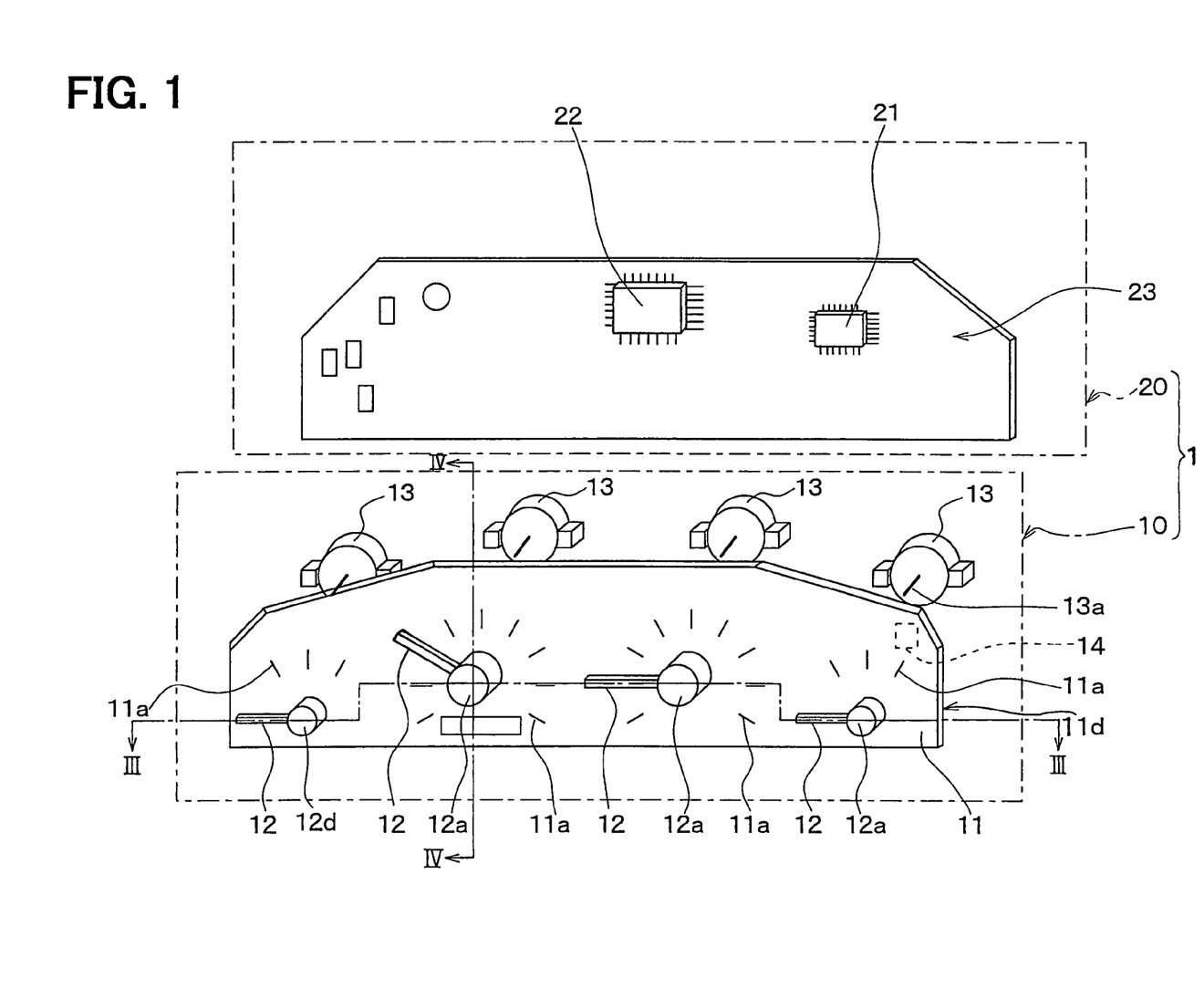
FIG. 1 is a perspective exploded view showing a meter unit according to a first embodiment of the present invention.
Figure 2:
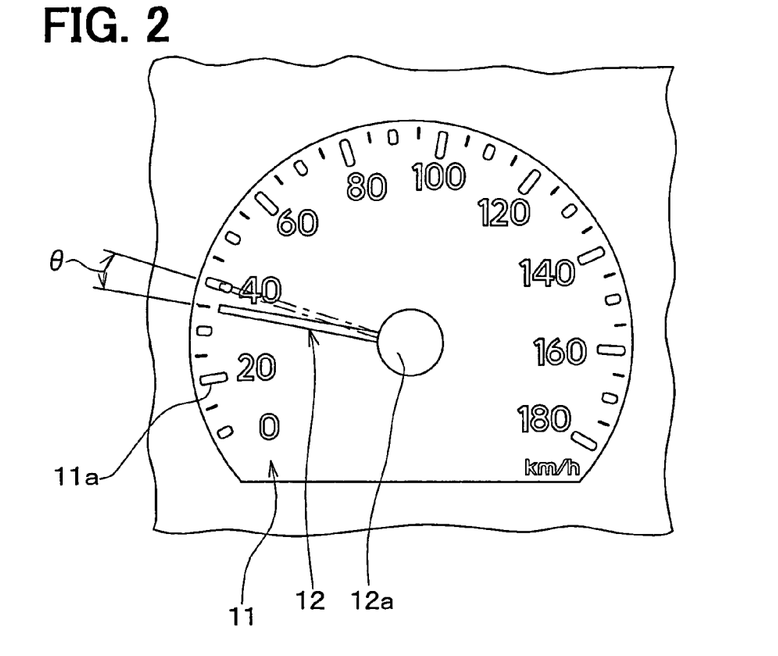
FIG. 2 is a front view showing a vehicle speed meter of the meter unit according to the first embodiment.

The indication part 10 includes a scale plate 11, an optical guide plate 11d, a pointer 12 and a stepping motor unit 13. The scale plate 11 has a scale 11a for indicating the physical quantity. The optical guide plate 11d with an illumination lamp (not shown) provides to illuminate the scale plate 11 from a backside toward a foreside of the scale plate 11. The illumination lamp radiates a light toward the optical guide plate. The stepping motor unit 13 rotates (i.e., rotationally drives) the pointer 12 so that the pointer 12 indicates (i.e., points up) a certain position of the scale 11a. Thus, the pointer 12 shows a certain value of the physical quantity.

The stepping motor unit 13 is mounted on a backside of the optical guide plate 11d. The stepping motor unit 13 includes a casing, a stepping motor, a gear system for reducing a rotation speed, and a rotation shaft 13a. The casing accommodates the stepping motor, the gear system and the rotation shaft 13a. When the stepping motor rotates a rotor of the stepping motor, a rotation speed of the rotor is reduced by the gear system so that the reduced rotation is transmitted to the rotation shaft 13a. Then, the rotation shaft 13a is rotated. The rotation shaft 13a extends from the backside of the scale plate 11 toward the foreside of the scale plate 11 through a pair of through holes of the optical guide plate 11a and the scale plate 11. The rotation shaft 13a is press-inserted into a pointer base 12a of the pointer 12 so that the rotation shaft 13a is fixed to the pointer base 12a. Thus, when the rotation shaft 13a is rotated, the pointer 12 is also rotated via the pointer base 12a.

The scale plate 11 includes a transparent film printed with the scale 11a thereon. The scale 11a is circularly disposed on the transparent film. The scale 11a shows different physical quantities such as a vehicle speed, an engine speed, a temperature of engine coolant and a fuel level. When the pointer 12 is rotated with using the stepping motor unit 13, the pointer 12 is rotated along with a foreside surface of the scale plate 11 until the pointer 12 indicates a certain value of the scale 11a. Then, the pointer 12 stops to rotate so that the pointer 12 shows the certain vale of the physical quantity.

The optical guide plate 11d is laminated on the backside surface of the scale plate 11. The illumination lamp radiates the light so as to illuminate the backside of the optical guide plate 11d. Then, the light is scattered and diffused inside the optical guide plate 11d so that the light expands into the whole optical guide plate 11d. Then, the light in the optical guide plate 11d illuminates toward the scale plate 11. Thus, the scale plate 11 is illuminated with the transmitted light.

The optical plate 11d includes a QR code indicator 14. Here, QR code (i.e., a quick response code) is a kind of two dimensional symbology, which is easily interpreted by an optical scanner. The QR code indicator 14 shows an indication deviation data of the indication part 10. The indication deviation data is a compensation data of an indication deviation of the indication part 10, which arises from a positioning deviation, an assembling positioning deviation, a printing positioning deviation and the like. The positioning deviation is a deviation of the pointer 12 in a case where the rotation shaft 13a of the stepping motor unit 13 is press-inserted into the pointer base 12a of the pointer 12. Specifically, when the shaft 13a is press-inserted into the base 12a, the positioning between the shaft 13a and the base 12a, i.e., the pointer 12 has a certain deviation, which causes the indication deviation. The assembling positioning deviation is a deviation of the stepping motor unit 13 in a case where the stepping motor unit 13 is mounted on the optical guide plate 11d. The printing positioning deviation is a deviation of the scale 11a in a case where the scale 11a is printed on the transparent film.

For example, when the pointer 12 is rotated to indicate a certain value on the basis of a detected value of a vehicle speed sensor without compensating with the indication deviation data, the pointer 12 indicates a different value of vehicle speed, which is different from the detected value of the vehicle speed. In a case where the detected value of the vehicle speed is, for example, 40 km/h shown as a dashed line in FIG. 2, the pointer 12 actually indicates the different value, which is different from 40 km/h and shown as a solid line in FIG. 2. In this case, the indication deviation is defined as an angle θ between the actual position of the pointer 12 and the correct position of the pointer 12. It is required to compensate the angle θ so as to indicate the correct value, i.e., the detected value. Specifically, the detected value detected by the vehicle speed sensor is preliminarily compensated with the indication deviation so that the pointer 12 indicates the correct value of the vehicle speed. Here, a plurality of indication deviations corresponding to different values of the vehicle speed is preliminarily investigated so that the indication deviation data is prepared. Specifically, the indication deviation data is composed of a plurality of indication deviations such as the angle θ. Each indication deviation corresponds to the different correct value of the vehicle speed. Thus, the indication deviation data of the indication part 10 is prepared.

The QR code indicator 14 is printed on the backside surface of the optical guide plate 11d. The QR code works as a storage means (i.e., a memory) for memorizing the indication deviation data of the indication part 10.

The control part 20 includes an EEPROM (i.e., an electrically erasable programmable read-only memory) 21 as a rewritable nonvolatile memory, a CPU 22 as a control means and a printed circuit board 23. The EEPROM 21 memorizes the indication deviation data shown in the QR code indicator 14. The CPU 22 controls the stepping motor unit 13. The EEPROM 21 and the CPU 22 are mounted on the printed circuit board 23.

Figure 4:
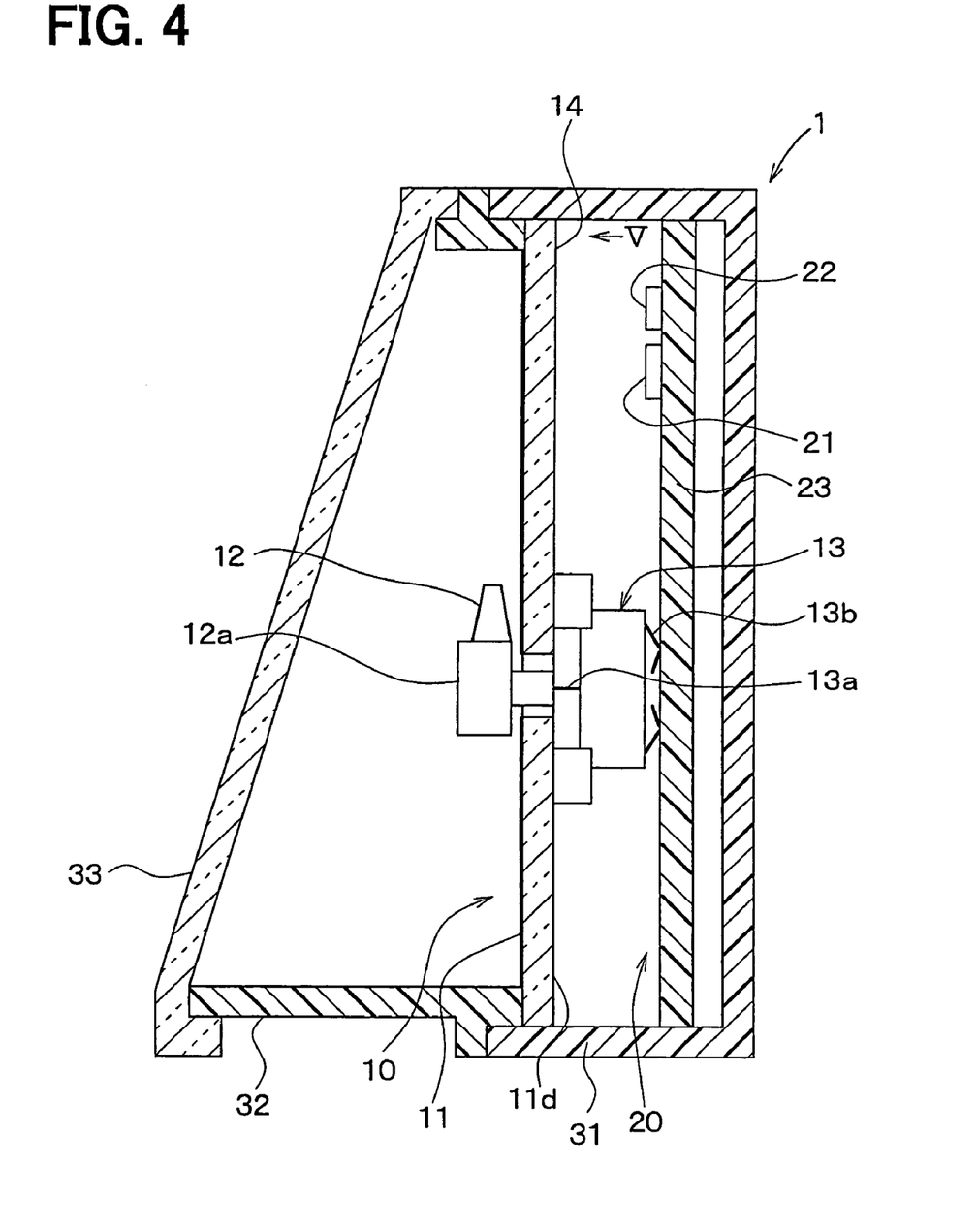
FIG. 4 is a cross-sectional view showing the meter unit taken along line IV—IV in FIG. 1.
Figure 5:
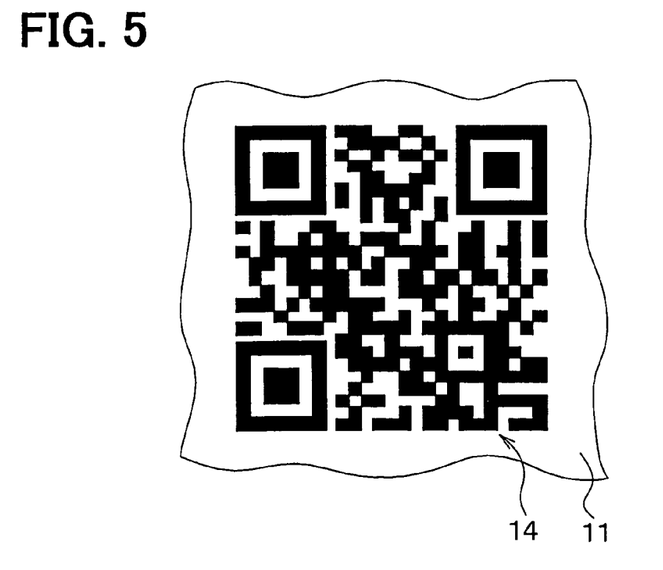
FIG. 5 is an arrow view showing a QR code indicator of the meter unit viewing from arrow V in FIG. 4.

FIG. 5 is a view of arrow V in FIG. 4 and shows the QR code indicator 14. The EEPROM 21 memorizes the indication deviation data shown (i.e., memorized) in the QR code indicator 14. The CPU 22 compensates the detected value of the physical quantity (e.g., the vehicle speed detected by the vehicle speed sensor) on the basis of the indication deviation data memorized in the EEPROM 21. Also the CPU 22 controls the stepping motor unit 13 on the basis of the compensated detected value so that the pointer 12 indicates the correct value (e.g., the correct vehicle speed).

In this embodiment, the meter unit 1 includes a plurality of pointers 12 and stepping motor units 13. Therefore, the CPU 22 controls a plurality of stepping motor units 13. In general, the CPU 22 for controlling a plurality of stepping motor units 13 is expensive. Therefore, in a case where the indication part 10 fails, the expensive control part 20 is not necessitated to exchange, so that the maintenance cost of the meter unit 1 is reduced. Further, the meter unit 1 can communicate with another electric equipment such as an engine ECU (i.e., electric control unit) with multiplex communication method. The CPU 22 controls to send and receive a multiplex signal in the multiplex communication.

Figure 3:
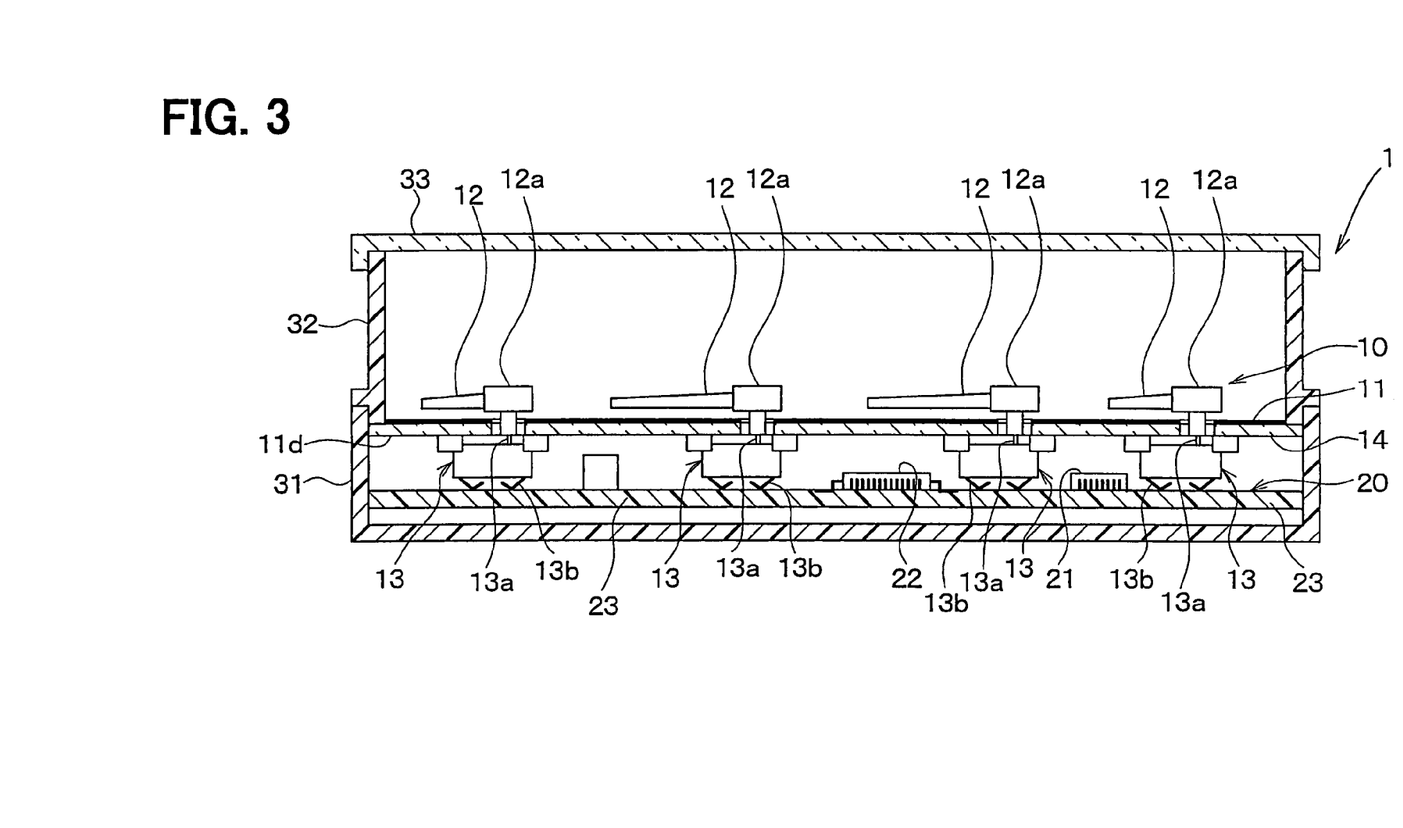
FIG. 3 is a cross-sectional view showing the meter unit taken along line III—III in FIG. 1.

As shown in FIGS. 3 and 4, the printed circuit board 23 is fixed to a resin casing 31 made of resin, so that the control part 20 is mounted in the resin casing 31.

The stepping motor unit 13 includes a terminal 13b, which extends toward the printed circuit board 23. When the indication part 10 is pressed on the surface of the printed circuit board 23, the terminal 13b of the stepping motor unit 13 contacts to another terminal of the printed circuit board 23 so that the terminal 13b electrically connects to the printed circuit board 23. A facing plate 32 is mounted on an opening of the resin casing 31 so as to sandwich the indication part 10 between the facing plate 32 and the printed circuit board 23. Thus, the indication part 10 is supported between them. A cover 33 is mounted on an opening of the facing plate 32. The cover 33 is made of transparent resin such as acrylic resin.

Figure 6:
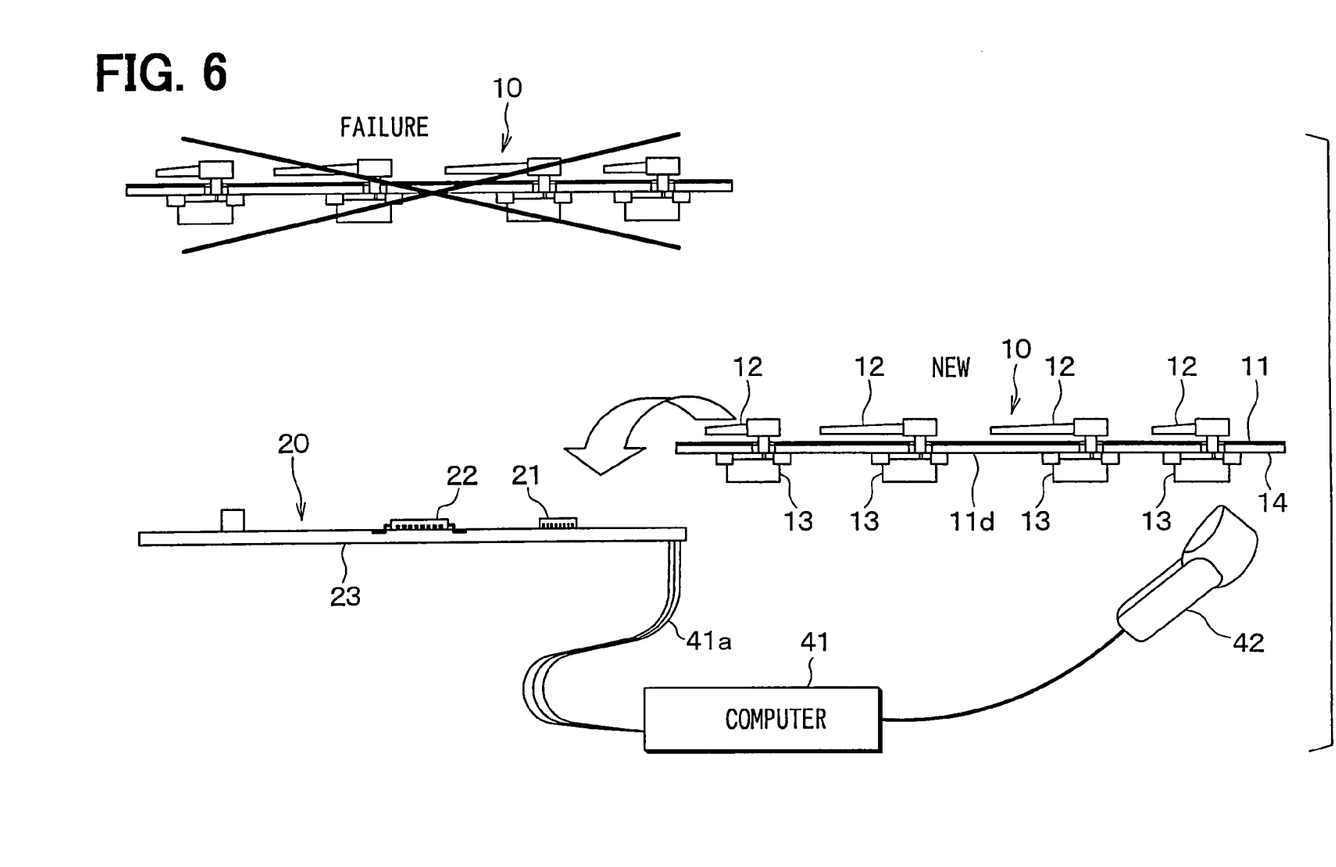
FIG. 6 is a schematic view explaining a repairing method in case of failure of an indication part of the meter unit according to the first embodiment.

If one part of the meter unit 1 fails after the meter unit 1 is delivered to a market place, the meter unit 1 is repaired as follows. FIG. 6 explains a repair method for repairing the meter unit 1 in a case where the one part of the meter unit 1 fails. Specifically, when one part of the indication part 10 such as the stepping motor unit 13 fails, the meter unit 1 is repaired with the repair method shown in FIG. 6. In FIG. 6, the cover 33 and the facing plate 32 is detached (i.e., removed) from the resin casing 31, so that the indication part 10 is also detached from the resin casing 31. In this case, only the damaged indication part 10 is exchanged, and the control part 20 is not exchanged. When the damaged indication part 10 (shown as FAILURER in FIG. 6) is exchanged to a new one 10 (shown as NEW in FIG. 6), a computer 41 (i.e., read write equipment) for reading and writing a data is connected to the printed circuit board 23 through a wire 41a. Then, a QR code reader 42 such as an optical scanner connects to the computer 41, so that the QR code reader 42 reads the new QR code indicator 14 printed on the transparent film of the new indication part 10. Then, the new indication deviation data shown in the new QR code indicator 14 is inputted into the computer 41. The computer 41 rewrites the old indication deviation data memorized in the EEPROM 21 to the new indication deviation data.

Thus, the indication deviation data memorized in the EEPROM 21 coincides to the actual indication deviation data of the indication part 10. The meter unit 1 can be repaired with exchanging only the damaged indication part 10. Specifically, the meter unit 1 is repaired without exchanging the whole meter unit 1, so that the maintenance cost of the meter unit 1 becomes small.

Figure 7:
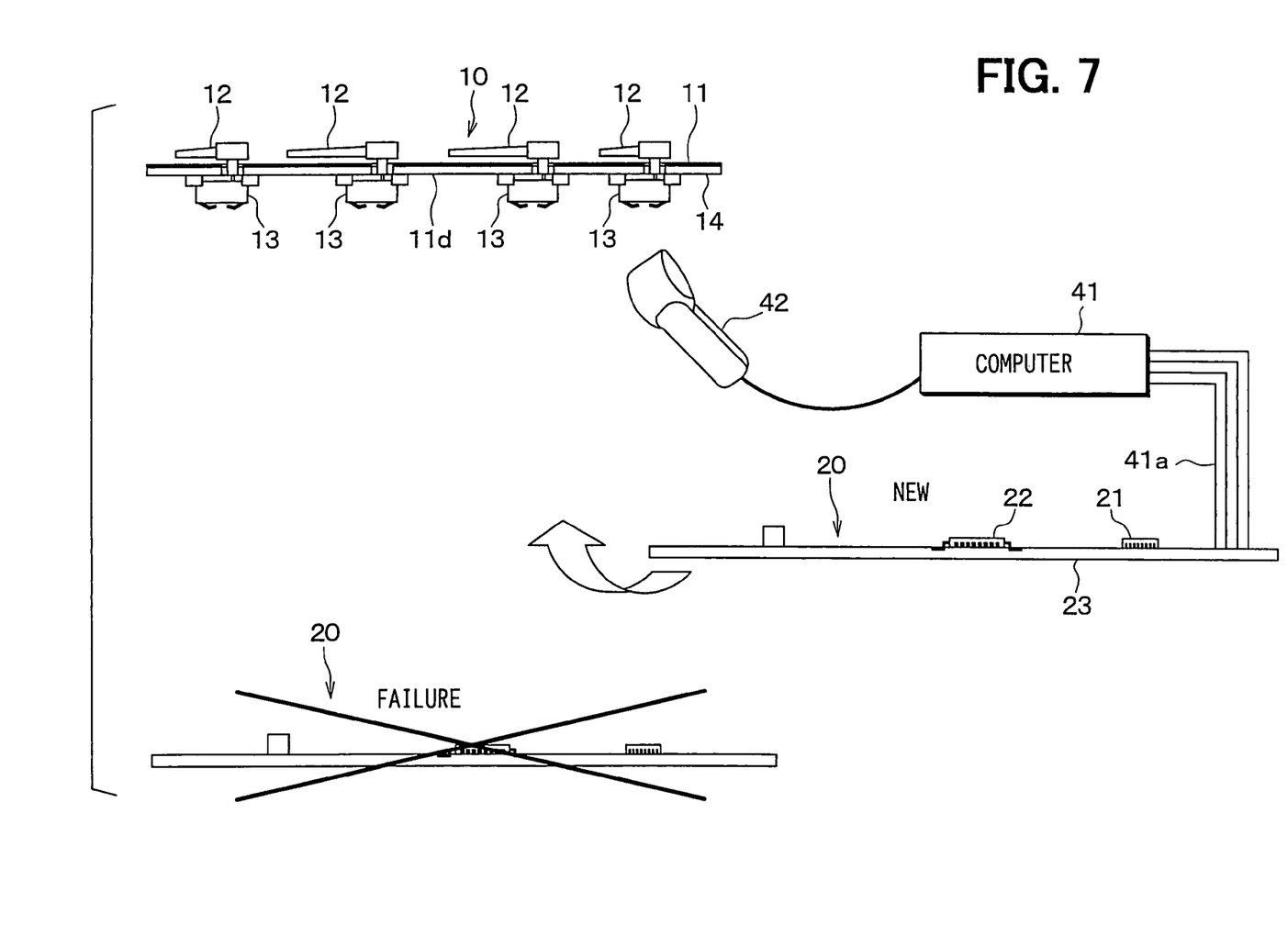
FIG. 7 is a schematic view explaining a repairing method in case of failure of a control part of the meter unit according to the first embodiment.

FIG. 7 explains a repair method for repairing the meter unit 1 in a case where the one part of the control part 20 such as the CPU 22 fails. In FIG. 7, the cover 33 and the facing plate 32 is detached from the resin casing 31, so that the indication part 10 is also detached from the resin casing 31. In this case, only the damaged control part 20 is exchanged, and the indication part 10 is not exchanged. When the damaged control part 20 (shown as FAILURE in FIG. 7) is exchanged to a new one 20 (shown as NEW in FIG. 7), the computer 41 is connected to the printed circuit board 23 through the wire 41a. Then, the QR code reader 42 connects to the computer 41, so that the QR code reader 42 reads the QR code indicator 14 printed on the transparent film of the indication part 10. Then, the indication deviation data shown in the QR code indicator 14 is inputted into the computer 41. The computer 41 rewrites the indication deviation data in the new EEPROM 21 of the new control part 20.

Thus, the indication deviation data memorized in the new EEPROM 21 coincides to the actual indication deviation data of the indication part 10. The meter unit 1 can be repaired with exchanging only the damaged control part 20. Specifically, the meter unit 1 is repaired without exchanging the whole meter unit 1, so that the maintenance cost of the meter unit 1 becomes small.

Further, the indication part 10 and the control part 20 connect electrically with being independent each other. Therefore, even if the design of the indication part 10 is changed in accordance with a type of vehicle or a grade of vehicle, the control part 20 can be a common part, i.e., the control part 20 can be the same part. Therefore, the manufacturing cost of the meter unit 1 is reduced Although the QR code indicator 14 is disposed on the optical guide plate 11d in the meter unit 1 shown in FIG. 1, the QR code indicator 14 can be disposed on other part, as long as the other part composes the indication part 10. For example, the QR code indicator 14 can be disposed on the scale plate 11.

Although the QR code indicator 14, as a memory for memorizing the indication deviation data, provides the QR code as a kind of two-dimensional code, the indication deviation data can be provided by a combination of the two-dimensional code and one selected from the group including a one-dimensional code, a dot mark, an IC chip (i.e., an integrated circuit chip), a sign, a letter, and a numerical character (i.e., a number). Further, the indication deviation data can be provided by at least one selected from the group including a one-dimensional code, a dot mark, an IC chip, a sign, a letter, and a numerical character.

(Second Embodiment)

Figure 8:
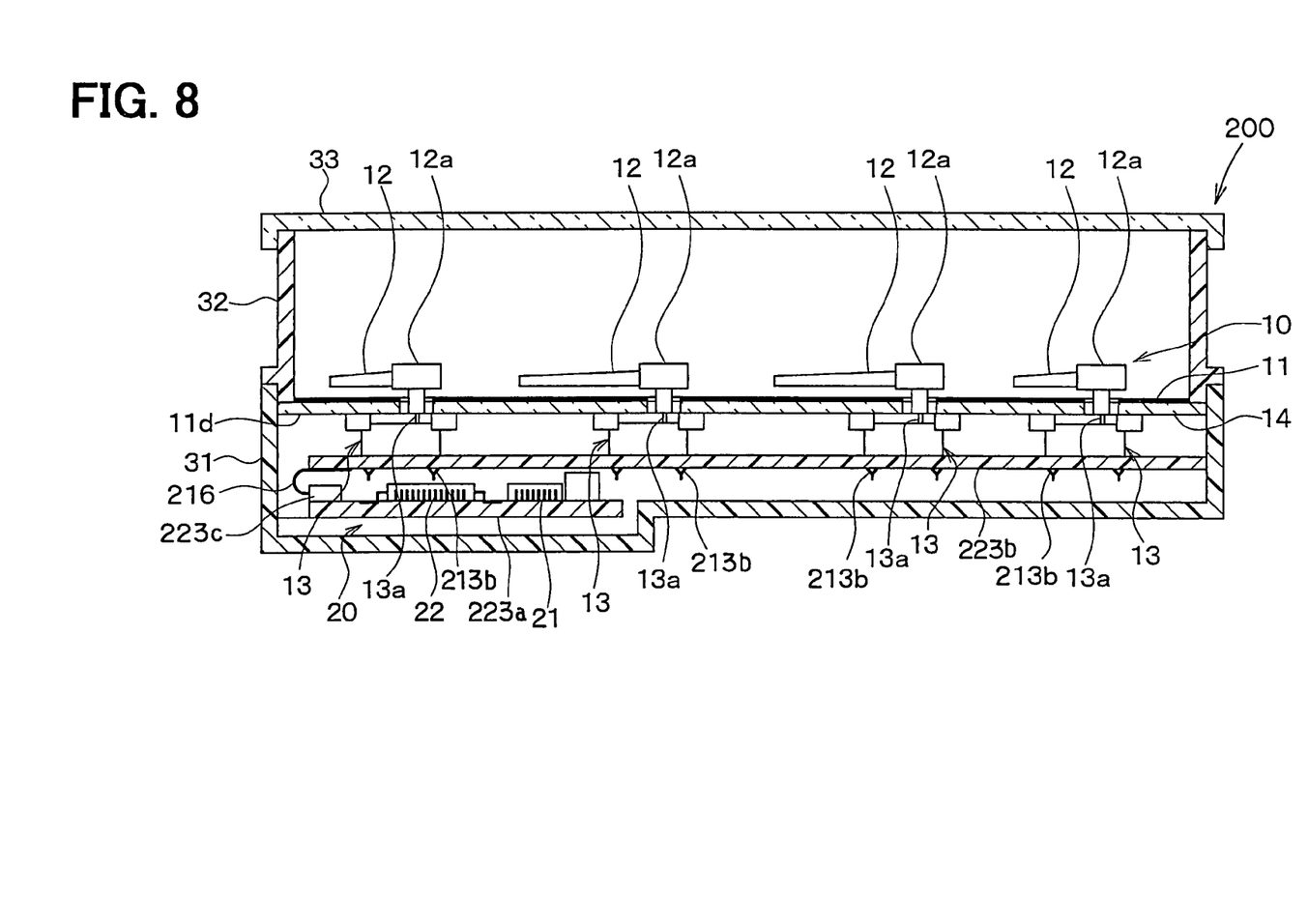
FIG. 8 is a cross-sectional view showing a meter unit according to a second embodiment of the present invention.
Figure 9A:
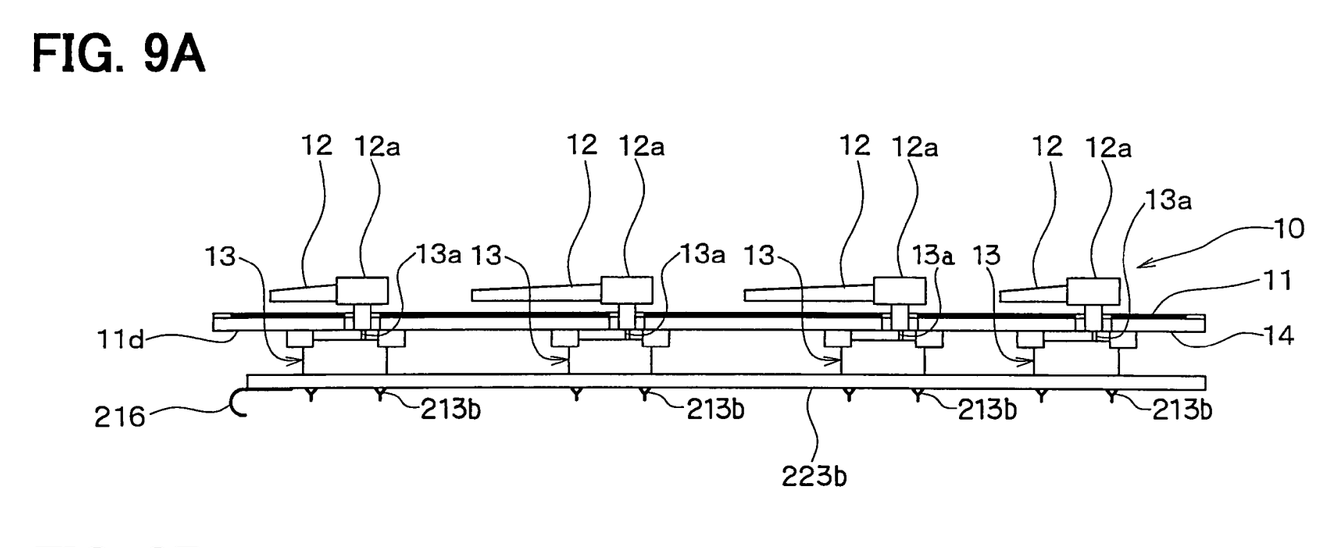
FIG. 9A is a schematic view showing an indication part of the meter unit.
Figure 9B:
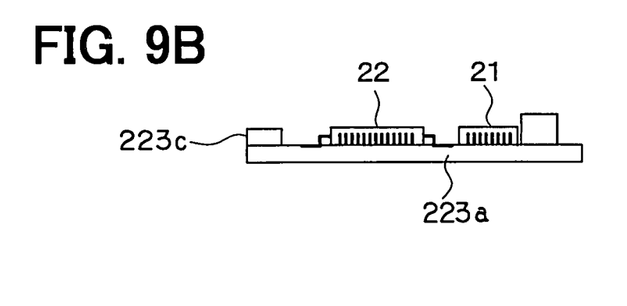
FIG. 9B is a schematic view showing a control part of the meter unit, according to the second embodiment.

A meter unit 200 according to a second embodiment of the present invention is shown in FIG. 8. The meter unit 200 has the first printed circuit board 223a and the second printed circuit board 223b. The first printed circuit board 223a is disposed on a control part side, and the second printed circuit board 223b is disposed on an indication part side. The first and second printed circuit boards 223a, 223b are separated each other. The second printed circuit board 223b composes the indication part 10, and the stepping motor unit 13 connects to the second printed circuit board 223b. The first and second printed circuit boards 223a, 223b are connected electrically together.

The stepping motor unit 13 is mounted on the second printed circuit board 223b. Specifically, a terminal 213b of the stepping motor unit 13 is soldered and fixed to the second printed circuit board 223b. The first and second printed circuit boards 223a, 223b are connected through a flexible printed circuit cable (i.e., a FPC cable or a FPC) 216 and a connector 223c.

Here, in the meter unit 1 shown in FIG. 1, the stepping motor unit 13 is directly mounted on the printed circuit board 23. Therefore, if the design of the indication part 10 is changed in accordance with the type of vehicle or the grade of vehicle, the printed circuit board 23 may be changed in accordance with the design change of the indication part 10. For example, when an arrangement of the stepping motor unit 13 on the scale plate 11 is changed, an arrangement of a land on the printed circuit board 23 may be changed, or an arrangement of a wiring pattern on the printed circuit board 23 may be changed. Thus, it is difficult to share the control part 20 as a common part.

However, in the meter unit 200 according to the second embodiment, the stepping motor unit 13 is mounted on the second printed circuit board 223b. Specifically, the stepping motor unit 13 is not directly mounted on the first printed circuit board 223a. Therefore, even if the design of the indication part 10 is changed in accordance with the type of vehicle or the grade of vehicle, the control part 20 as a common part can be shared. Specifically, although the second printed circuit board 223b is changed in accordance with the design change of the indication part 10, the first printed circuit board 223a is not changed so that the control part 20 as a common part can be shared. Therefore, the manufacturing cost of the meter unit 200 is reduced.

(Third Embodiment)

In the meter unit 1 shown in FIG. 1, the EEPROM 21 as a memory for memorizing the indication deviation data is separated from the CPU 22 as a controller for controlling the stepping motor unit 13.

Figure 10:
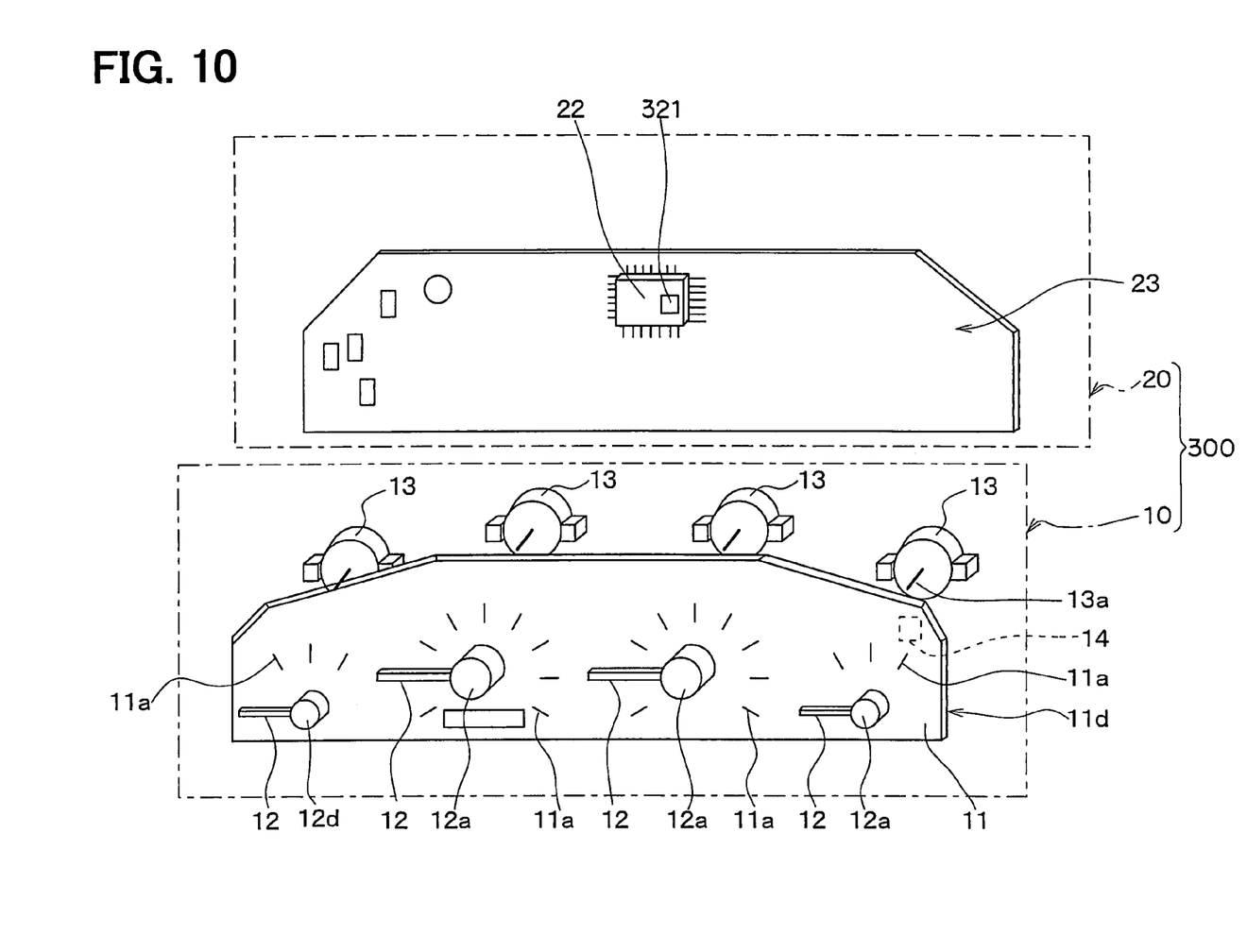
FIG. 10 is a perspective exploded view showing a meter unit according to a third embodiment of the present invention.

However, in a meter unit 300 according to a third embodiment of the present invention, the memory and the controller are integrated into one body. Specifically, as shown in FIG. 10, a flash memory 321 as the memory is incorporated (i.e., integrated) in the CPU 22 as the controller. Thus, the manufacturing cost of the meter unit 300 is reduced.

Such changes and modifications are to be understood as being within the scope of the present invention as defined by the appended claims.

What is claimed is:

1. A meter unit for indicating a physical quantity, which is detected by an outside physical quantity sensor, the unit comprising:

an indication part for indicating the physical quantity; and a control part, wherein the indication part memorizes a first indication deviation data, which provides a deviation between a detected value detected by the sensor and a raw value indicated by the indication part without compensating the deviation, wherein the control part memorizes a second indication deviation data of the indication part, compensates the detected value on the basis of the second indication deviation data, and controls the indication part on the basis of the compensated detected value, and wherein the second indication deviation data is rewritable so that the second indication deviation data coincides with the first indication deviation data.

2. The unit according to claim 1, wherein the indication part includes:

a scale plate having a scale for showing the physical quantity;

a pointer for indicating the compensated detected value of the physical quantity;

a stepping motor unit for rotating the pointer; and a first memory for memorizing the first indication deviation data of the indication part, wherein the control part includes:

a second memory for memorizing the second indication deviation data; and a controller for compensating the detected value on the basis of the second indication deviation data, and for controlling the stepping motor unit on the basis of the compensated detected value, and wherein the second memory is capable of rewriting the second indication deviation data to the first indication deviation data.

3. The unit according to claim 2, wherein the first memory is provided by at least one of a two-dimensional code, a one-dimensional code, a dot mark, an integrated circuit chip, a sign, a letter and a numerical character.

4. The unit according to claim 3, wherein the first memory is a QR code indicator as a two-dimensional code.

5. The unit according to claim 2, wherein the indication part further includes a plurality of pairs of the pointer and the stepping motor unit, each pair of which provides to indicate a physical quantity, respectively, wherein the second memory memorizes the second indication deviation data corresponding to a plurality of pairs of the pointer and the stepping motor unit, and wherein the controller compensates each detected value detected by each outside physical quantity sensor on the basis of the second indication deviation data, and controls each stepping motor unit on the basis of the compensated detected value.

6. The unit according to claim 2, further comprising:

a casing for accommodating the indication part and the control part, wherein the indication part and the control part are independently mounted in the casing, and are electrically connected to each other.

7. The unit according to claim 1, wherein the second indication deviation data is obtained in a manufacturing process of the meter, wherein the indication part includes a dial plate, a plurality of pointers, a plurality of stepping motors, and wherein the control part includes a CPU and a EEPROM.

* * * * *